(12) United States Patent
Suciu et al.

(10) Patent No.: US 10,247,097 B2
(45) Date of Patent: Apr. 2, 2019

(54) GAS TURBINE ENGINE WITH PLURAL ACCESSORY AIR PATHS

(71) Applicant: United Technologies Corporation, Hartford, CT (US)

(72) Inventors: Gabriel L. Suciu, Glastonbury, CT (US); Jesse M. Chandler, South Windsor, CT (US)

(73) Assignee: United Technologies Corporation, Farmington, CT (US)

( * ) Notice: Subject to any disclaimer, the term of this patent is extended or adjusted under 35 U.S.C. 154(b) by 684 days.

(21) Appl. No.: 14/443,078

(22) PCT Filed: Jun. 20, 2013

(86) PCT No.: PCT/US2013/046681
§ 371 (c)(1),
(2) Date: May 15, 2015

(87) PCT Pub. No.: WO2014/092777
PCT Pub. Date: Jun. 19, 2014

(65) Prior Publication Data
US 2015/0292410 A1  Oct. 15, 2015

Related U.S. Application Data

(60) Provisional application No. 61/735,209, filed on Dec. 10, 2012.

(51) Int. Cl.
*F02C 7/18* (2006.01)
*F02C 6/08* (2006.01)
(Continued)

(52) U.S. Cl.
CPC .............. *F02C 7/18* (2013.01); *F01D 25/12* (2013.01); *F02C 6/08* (2013.01); *F02C 9/18* (2013.01);
(Continued)

(58) Field of Classification Search
CPC ...... B64D 2013/0603; F02C 6/08; F02C 7/14; F02C 9/18; F02K 3/062; F02K 3/06
See application file for complete search history.

(56) References Cited

U.S. PATENT DOCUMENTS 3,363,419 A * 1/1968 Wilde ................. F02K 3/062
                                                    415/119
4,546,605 A * 10/1985 Mortimer ............. F01D 17/105
                                                    184/6.11
(Continued)

FOREIGN PATENT DOCUMENTS

EP  0211513 A1  2/1987
EP  2273075 A2  1/2011

OTHER PUBLICATIONS

Supplementary European Search Report for European Application No. 13862641.1 dated Jul. 12, 2016.
(Continued)

*Primary Examiner* — Steven Sutherland
*Assistant Examiner* — Thuyhang Nguyen
(74) *Attorney, Agent, or Firm* — Carlson, Gaskey & Olds, P.C.

(57) ABSTRACT

A gas turbine engine has a first source of air to be delivered into a core of the engine, and a second source of air, distinct from the first source of air and including separately controlled first and second fans, each delivering air into respective first and second conduits connected to distinct auxiliary applications.

15 Claims, 3 Drawing Sheets

(51) Int. Cl.
  *F02K 3/062*   (2006.01)
  *F02K 3/06*    (2006.01)
  *F01D 25/12*   (2006.01)
  *F02C 9/18*    (2006.01)
  *B64D 13/06*   (2006.01)

(52) U.S. Cl.
  CPC ............. *F02K 3/06* (2013.01); *F02K 3/062* (2013.01); *B64D 2013/0603* (2013.01); *F05D 2220/324* (2013.01); *F05D 2220/327* (2013.01); *F05D 2250/51* (2013.01); *Y02T 50/675* (2013.01)

(56) References Cited

U.S. PATENT DOCUMENTS

| | | | |
|---|---|---|---|
| 4,934,140 A * | 6/1990 | Dennison | F02C 7/20 244/54 |
| 4,999,994 A | 3/1991 | Rüd et al. | |
| 5,012,639 A | 5/1991 | Ream et al. | |
| 5,137,230 A * | 8/1992 | Coffinberry | B64C 21/06 244/118.5 |
| 5,269,135 A | 12/1993 | Vermejan et al. | |
| 5,899,085 A | 5/1999 | Williams | |
| 6,351,940 B1 | 3/2002 | Guinan et al. | |
| 7,188,488 B2 * | 3/2007 | Army, Jr. | B64D 13/08 62/401 |
| 8,266,889 B2 | 9/2012 | Coffinberry | |
| 2003/0024233 A1 | 2/2003 | Snyder | |
| 2010/0314877 A1 | 12/2010 | Finney | |
| 2011/0179763 A1 | 7/2011 | Rajamani | |

OTHER PUBLICATIONS

International Preliminary Report on Patentability for International Application No. PCT/US2013/046681 dated Jun. 25, 2015.
Search Report and Written Opinion from corresponding PCT/US2013/046681.

* cited by examiner

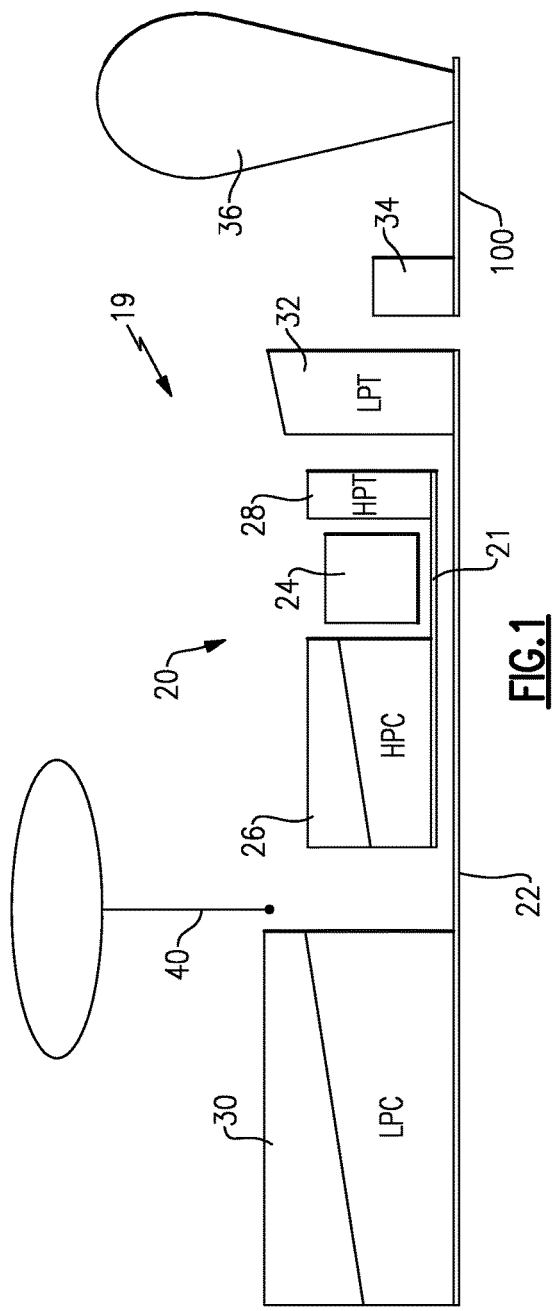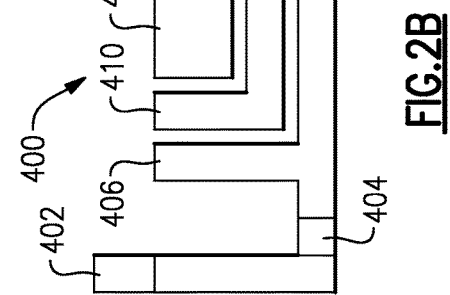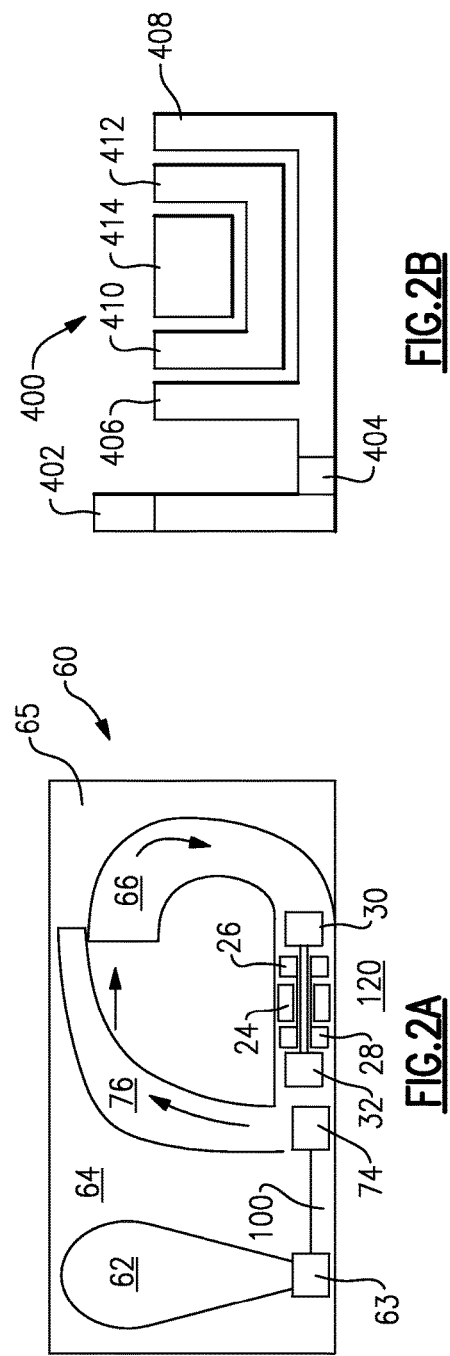

GAS TURBINE ENGINE WITH PLURAL ACCESSORY AIR PATHS

BACKGROUND

This application relates to accessory air flow for use on an aircraft.

Gas turbine engines typically need a good deal of accessory air. Air is utilized for various purposes such as cooling components on the engine. Also, gas turbine engines utilized on the aircraft also supply air for use in the cabin of the aircraft. All of these applications require relatively high volumes of air.

Historically, a fan drove air into the gas turbine engine. This fan has typically been driven at the same speed as a lower pressure compressor which is downstream of the fan. More recently, a gear reduction has been incorporated between the fan and the low pressure compressor, and in such engines, the fan rotates at a slower speed compared to the low pressure compressor. With such engines, the air available for accessory use is moving at a slower speed than in the past, and there may not be sufficient volume as would be desirable.

SUMMARY

In a featured embodiment, a gas turbine engine has a first source of air to be delivered into a core of the engine, and a second source of air, distinct from the first source of air and including separately controlled first and second fans, each delivering air into respective first and second conduits connected to distinct auxiliary applications.

In another embodiment according to the previous embodiment, the first and second fans are positioned to be downstream of a heat exchanger.

In another embodiment according to any of the previous embodiments, the heat exchanger is an air to oil cooler.

In another embodiment according to any of the previous embodiments, one of the applications is for cooling a pitch control mechanism for a propeller included in the gas turbine engine.

In another embodiment according to any of the previous embodiments, at least one of the applications is for cooling a gear reduction incorporated into the gas turbine engine to drive a propulsor.

In another embodiment according to any of the previous embodiments, the air to oil cooler receives oil which is utilized to cool the gear reduction for driving the propulsor.

In another embodiment according to any of the previous embodiments, the first and second fans may be caused to deliver distinct amounts of air to first and second conduits each leading to one of the distinct auxiliary locations.

In another embodiment according to any of the previous embodiments, at least one of the applications is for an environmental control system.

In another embodiment according to any of the previous embodiments, at least one of the applications is for an environmental control system.

In another embodiment according to any of the previous embodiments, the first and second fans are separately controlled such that they may be caused to deliver distinct amounts of air into the first and second conduits.

In another embodiment according to any of the previous embodiments, at least one of the applications is for cooling a gear reduction incorporated into the gas turbine engine to drive a propulsor.

In another embodiment according to any of the previous embodiments, one of the applications is for cooling a pitch control mechanism for a propeller included in the gas turbine engine.

In another embodiment according to any of the previous embodiments, a propulsor is provided in the gas turbine engine.

In another embodiment according to any of the previous embodiments, the propulsor is driven by a propulsor turbine through a propulsor drive shaft that is downstream of a turbine section driving a compressor section.

In another embodiment according to any of the previous embodiments, the propulsor turbine drives a fan at an upstream end of the engine.

In another embodiment according to any of the previous embodiments, the turbine section includes a first and second turbine rotor. The compressor section includes a first and second compressor rotor. The first turbine rotor drives the first compressor rotor, and the second turbine rotor drives the second compressor rotor.

In another embodiment according to any of the previous embodiments, an axially outer position is defined by the fan. The propulsor turbine is positioned between the fan and the first and second turbine rotors. The first and second compressor rotors are positioned further into the engine relative to the first and second turbine rotors.

In another embodiment according to any of the previous embodiments, the propulsor is at least one propeller.

In another embodiment according to any of the previous embodiments, the first turbine rotor drives the first compressor rotor through a first shaft and the second turbine rotor drives the second compressor rotor through a second shaft. The first shaft surrounds the second shaft. The propulsor drive shaft is spaced axially further into the engine relative to the first and second shafts.

In another embodiment according to any of the previous embodiments, the propulsor is a propeller.

BRIEF DESCRIPTION OF THE DRAWINGS

FIG. 1 schematically shows a three spool gas turbine engine.
FIG. 2A shows a second embodiment.
FIG. 2B shows another embodiment.

DETAILED DESCRIPTION

Figure 3:
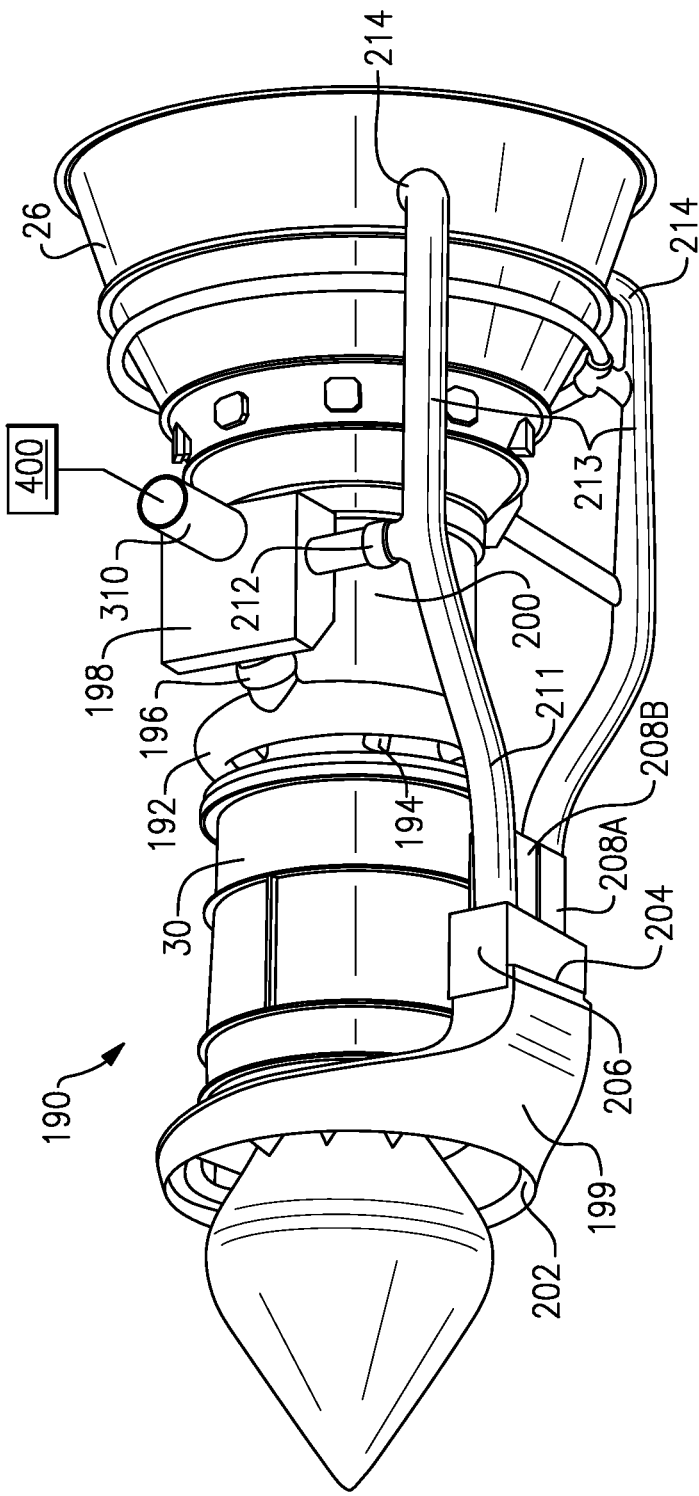
FIG. 3 shows a first embodiment air supply system.

A gas turbine engine 19 is schematically illustrated in FIG. 1. A core engine, or gas generator 20, includes high speed shaft 21 is part of a high speed spool along with a high pressure turbine rotor 28 and a high pressure compressor rotor 26. A combustion section 24 is positioned intermediate the high pressure compressor rotor 26 and the high pressure turbine rotor 28. A shaft 22 of a low pressure spool connects a low pressure compressor rotor 30 to a low pressure turbine rotor 32.

Engine 19 also includes a free turbine 34 is shown positioned downstream of the low pressure turbine rotor 32 and serves to drive a propeller 36.

Various embodiments are within the scope of the disclosed engine. These include embodiments in which:
a good deal more work is down by the low pressure compressor rotor 30 than is done by the high pressure compressor rotor 26;

the combination of the low pressure compressor rotor 30 and high pressure compressor rotor 26 provides an overall pressure ratio equal to or above about 30;

the low pressure compressor rotor 30 includes eight stages and has a pressure ratio at cruise conditions of 14.5;

the high pressure compressor rotor 26 had six stages and an overall pressure ratio of 3.6 at cruise;

a ratio of the low pressure compressor pressure ratio to the high pressure compressor ratio is greater than or equal to about 2.0, and less than or equal to about 8.0;

more narrowly, the ratio of the two pressure ratios is between or equal to about 3.0 and less than or equal to about 8;

even more narrowly, the ratio of the two pressure ratios is greater than about 3.5.

In the above embodiments, the high pressure compressor rotor 26 will rotate at slower speeds than in the prior art. If the pressure ratio through the fan and low pressure compressor are not modified, this could result in a somewhat reduced overall pressure ratio. The mechanical requirements for the high pressure spool, in any event, are relaxed.

With the lower compressor, the high pressure turbine rotor 28 may include a single stage. In addition, the low pressure turbine rotor 32 may include two stages.

By moving more of the work to the low pressure compressor rotor 30, there is less work being done at the high pressure compressor rotor 26. In addition, the temperature at the exit of the high pressure compressor rotor 26 may be higher than is the case in the prior art, without undue challenges in maintaining the operation.

A bleed line or port 40 is positioned between the low pressure compressor rotor 30 and the high pressure compressor rotor 26. Details of this porting are disclosed below.

Variable vanes are less necessary for the high pressure compressor rotor 26 since it is doing less work. Moreover, the overall core size of the combined compressor rotors 30 and 26 is reduced compared to the prior art.

The engine 60 as shown in FIG. 2A includes a two spool core engine 120 including a low pressure compressor rotor 30, a low pressure turbine rotor 32, a high pressure compressor rotor 26, and a high pressure turbine rotor 28, and a combustor 24 as in the prior embodiments. This core engine 120 is a so called "reverse flow" engine meaning that the compressor 30/26 is spaced further into the engine than is the turbine 28/32. Air downstream of the fan rotor 62 passes into a bypass duct 64, and toward an exit 65. However, a core inlet duct 66 catches a portion of this air and turns it to the low pressure compressor 30. The air is compressed in the compressor rotors 30 and 26, combusted in a combustor 24, and products of this combustion pass downstream over the turbine rotors 28 and 32. The products of combustion downstream of the turbine rotor 32 pass over a fan drive turbine 74. Then, the products of combustion exit through an exit duct 76 back into the bypass duct 64 (downstream of inlet 66 such that hot gas is not re-ingested into the core inlet 65), and toward the exit 65. A gear reduction 63 may be placed between the fan drive turbine 74 and fan 62.

The core engine 120, as utilized in the engine 60, may have characteristics similar to those described above with regard to the core engine 20.

The engines 19 and 60 are similar in that they have what may be called a propulsor turbine (34 or 74) which is spaced to be axially downstream of the low pressure turbine rotor 32. Further, the high pressure spool radially surrounds the low pressure spool, but neither of the spools surround the propulsor turbine, nor the shaft 100 connecting the propulsor turbine to the propellers 36 or fan 62. In this sense, the propulsor rotor is separate from the gas generator portion of the engine.

Another engine embodiment 400 is illustrated in FIG. 2B. In embodiment 400, a fan rotor 402 is driven by a fan drive turbine 408 through a gear reduction 404. A lower pressure compressor 406 is also driven by the fan drive turbine 408. A high pressure turbine 412 drives a high pressure compressor 410. A combustor section 414 is located between the compressor sections 406/410 and turbine sections 412/408. In such engines, the fan 402 now rotates at a slower speed than it would have in a direct drive engine.

All of the engines illustrated in FIGS. 1, 2A, and 2B lack a high speed fan delivering air into the inlet of the engine. As such, they all face the challenges with regard to receiving sufficient air volume.

Figure 4:
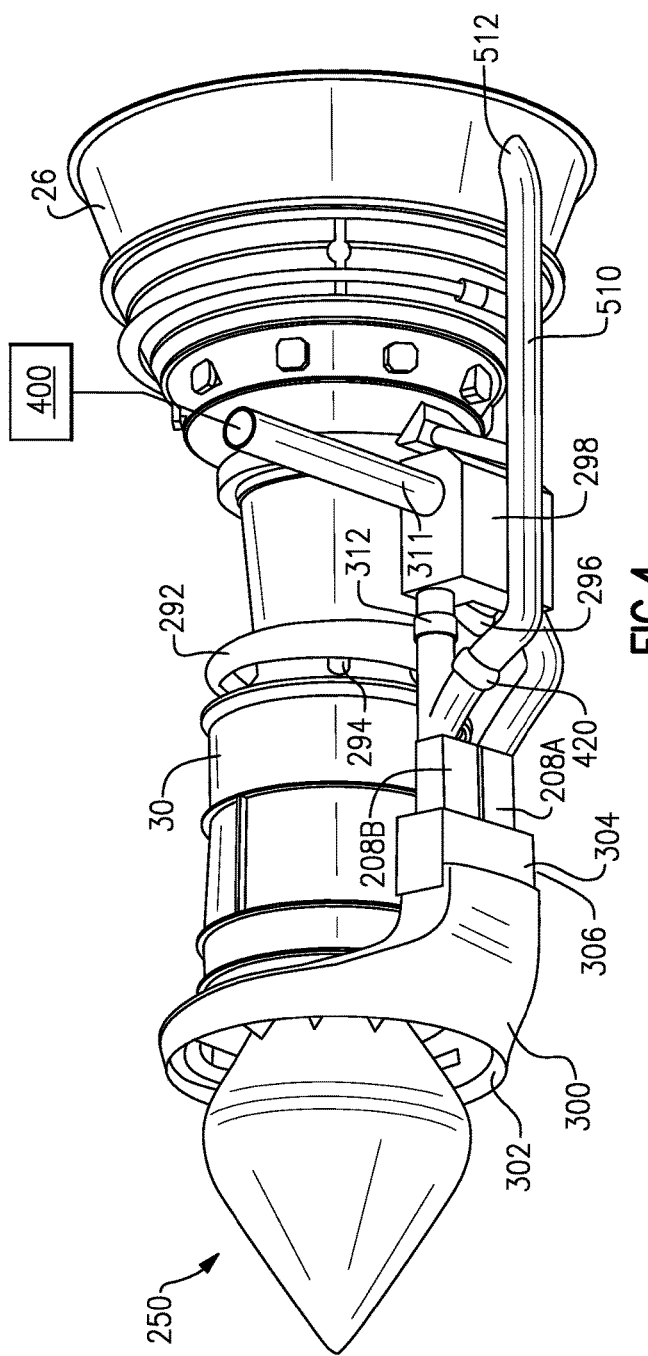
FIG. 4 shows a second embodiment.

Further details of the bleed line or port 40 and an associated air supply system are shown in FIGS. 3 and 4.

As shown in FIG. 3, an air supply system 190 incorporates a manifold 192 provided with a plurality of bleed lines or ports 194 and which communicate with an intermediate compressor case 200. The intermediate compressor case 200 is positioned between the low pressure compressor 30 and the high pressure compressor 26.

The pressure of the air supplied by the low pressure compressor 30 will vary dramatically during operation of an associated engine. Thus, at some point, the air pressure delivered from the ports 194 may be undesirably high.

A supply of lower pressure air is used to address this concern. An inlet 202 to a low pressure manifold 199 communicates through a heat exchanger 206. The heat exchanger 206 may be utilized to cool oil at other locations. A particle separator 204 is positioned to filter dirt particles out of an air supply stream being delivered downstream through fans 208a and 208b to an air supply line 211. Air supply line 211 may communicate through a valve 212 to a mixing box 198. The valve 212 is controlled in combination with a valve 196 associated with the manifold 192, such that the flow of air from the higher pressure manifold 192 and the lower pressure source 211, are properly mixed to achieve a desired pressure at an outlet 310. The outlet 310 leads to an environmental control system 400 for supplying air for use on an associated aircraft.

A control, such as a full authority digital engine control, may control the valves 196 and 212, based upon the pressure, temperature and any other variables within the operation of the associated engine.

A worker of ordinary skill in the art would recognize how to achieve a desired pressure at the outlet 310. The desired pressure at the outlet 310 may be dictated by the aircraft manufacturer.

When the valve 212 is open, air flows from the source 211 through the mixing box 198. However, as the valve 212 is moved toward a more closed position, that air is delivered through an outlet 214 downstream of the high pressure compressor 26.

FIG. 4 shows an alternative embodiment 250. Alternative embodiment 250 is generally the same as the embodiment 190. An inlet 302 leads into a low pressure supply manifold 300. There is a dirt separator 304, a heat exchanger 306 and fans 308a and 308b. Valves 312 and 296 are controlled to control the pressure of the air reaching a mixing box 298 which communicates with an outlet 311, and eventually the environmental control system 400. A pipe 510 communicating a lower pressure air supply into the mixing box 298 passes air through a one-way valve 420 and to the outlet 512, similar to the first embodiment.

As mentioned above, with an embodiment such as shown in FIG. 2B, there may not be sufficient air delivered for all of the uses anticipated by FIGS. 3 and 4. The same is true with the engines shown in FIGS. 1 and 2A.

Figure 5:
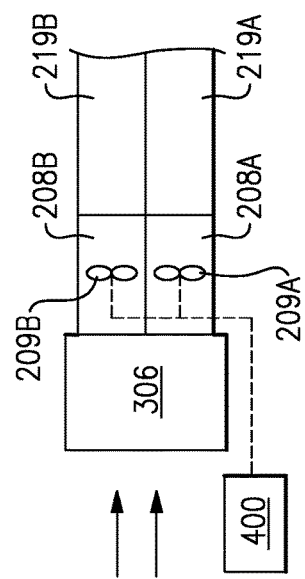
FIG. 5 shows a schematic system.

Thus, the present invention utilizes two fans 208A and 208B to assist in driving the air flow. The two fans 208A and 208B are shown in FIG. 5 downstream of the heat exchanger 306. They will serve to induce air flow into two conduits 219A and 219B, which will go to distinct applications, such as are shown, for example, in FIGS. 3 and 4. Impellers 209A and 209B are shown associated with each fan. A control 400 is shown schematically for controlling the speed of the impellers 209A and 209B. Now, by controlling the relative speeds of the two fans 208A and 208B, the amount of air delivered into the two conduits 219A and 219B can be controlled.

As can be appreciated, the control 400 can control the fan impellers 209A and 209B to rotate at distinct speeds. Alternatively, the fans 208A and 208B may also be provided with distinct sizes such that they deliver distinct volumes of airflow into conduits 219A and 219B. Should the location receiving air from the conduit 219A require more air than the location receiving air from the conduit 219B, than the impeller 209A may be driven at a higher speed than the impeller 209B to deliver increased airflow to the conduit 219A.

In addition, the required volume by the various locations and systems receiving air will vary during flight operation. Thus, the control 400 will be programmed to anticipate the change in airflow volume needs of the system, and to modify the speed and hence the volume of airflow provided by the impellers 209A and 209B, as appropriate. Thus, a sufficient quantity of air will be provided for the various applications that may be required on an aircraft application.

Although an embodiment of this invention has been disclosed, a worker of ordinary skill in this art would recognize that certain modifications would come within the scope of this disclosure. For that reason, the following claims should be studied to determine the true scope and content of this disclosure.

The invention claimed is:

1. A gas turbine engine comprising:
a first source of air to be delivered into a core of the engine, a second source of air, distinct from said first source of air, and a controller configured to separately control first and second fans, each delivering air into respective first and second conduits connected to distinct auxiliary applications;
wherein said first and second fans are separately controlled to deliver distinct amounts of air into said first and second conduits, said controller programmed to deliver distinct amounts of air into said first and second conduits as flight operation changes, to provide sufficient quantity of air to said distinct auxiliary applications as flight operation changes;
wherein said first and second fans are positioned to be downstream of a heat exchanger and in fluid communication with the heat exchanger; and
wherein the first fan, the second fan, and the heat exchanger are located radially outward of a compressor of the gas.

2. The gas turbine engine as set forth in claim 1, wherein said heat exchanger is an air to oil cooler.

3. The gas turbine engine as set forth in claim 2, wherein one of said applications is for cooling a pitch control mechanism for a propeller included in the gas turbine engine.

4. The gas turbine engine as set forth in claim 2, wherein at least one of the applications is for cooling a gear reduction incorporated into the gas turbine engine to drive a propulsor.

5. The gas turbine engine as set forth in claim 4, wherein said air to oil cooler receives oil which is utilized to cool said gear reduction for driving said propulsor.

6. The gas turbine engine as set forth in claim 2, wherein at least one of said applications is for an environmental control system.

7. The gas turbine engine as set forth in claim 1, wherein at least one of said applications is for an environmental control system.

8. The gas turbine engine as set forth in claim 1, wherein at least one of the applications is for cooling a gear reduction incorporated into the gas turbine engine to drive a propulsor.

9. The gas turbine engine as set forth in claim 1, wherein one of said applications is for cooling a pitch control mechanism for a propeller included in the gas turbine engine.

10. The gas turbine engine as set forth in claim 1, wherein a propulsor is provided in the gas turbine engine.

11. The gas turbine engine as set forth in claim 10, wherein said propulsor is driven by a propulsor turbine through a propulsor drive shaft that is downstream of a turbine section driving a compressor section.

12. The gas turbine engine as set forth in claim 11, wherein said turbine section including a first and second turbine rotor, and said compressor section including a first and second compressor rotor with said first turbine rotor driving said first compressor rotor, and said second turbine rotor driving said second compressor rotor.

13. The gas turbine engine as set forth in claim 11, wherein said propulsor is at least one propeller.

14. The gas turbine engine as set forth in claim 13, wherein said first turbine rotor driving said first compressor rotor through a first shaft and said second turbine rotor driving said second compressor rotor through a second shaft, with said first shaft surrounding said second shaft, and said propulsor drive shaft being spaced axially further into the engine relative to said first and second shafts.

15. The gas turbine engine as set forth in claim 10, wherein said propulsor is a propeller.

* * * * *